(12) United States Patent
Lipovkov (10) Patent No.: US 10,536,840 B2
(45) Date of Patent: Jan. 14, 2020

(54) SYSTEM AND METHOD FOR SIM VIRTUALIZATION OF SIM AND SIM-LESS MOBILE TERMINALS

(71) Applicant: David Lipovkov, Ganei Tikva (IL)

(72) Inventor: David Lipovkov, Ganei Tikva (IL)

( * ) Notice: Subject to any disclaimer, the term of this patent is extended or adjusted under 35 U.S.C. 154(b) by 102 days.

(21) Appl. No.: 15/787,724

(22) Filed: Oct. 19, 2017

(65) Prior Publication Data

US 2018/0109942 A1 Apr. 19, 2018

Related U.S. Application Data (60) Provisional application No. 62/409,895, filed on Oct. 19, 2016, provisional application No. 62/414,737, filed on Oct. 30, 2016.

(51) Int. Cl.
| | |
|---|---|
| *H04W 8/18* | (2009.01) |
| *H04B 1/3816* | (2015.01) |
| *H04M 1/725* | (2006.01) |
| *G06F 3/0482* | (2013.01) |
| *G06F 3/0484* | (2013.01) |

(52) U.S. Cl.
CPC .......... *H04W 8/183* (2013.01); *H04B 1/3816* (2013.01); *G06F 3/0482* (2013.01); *G06F 3/04842* (2013.01); *H04M 1/72519* (2013.01)

(58) Field of Classification Search
CPC .................................. H04W 8/18; H04B 1/38
USPC ....... 455/422.1, 425, 67.11, 550.1, 509, 551, 455/556.1, 557, 558
See application file for complete search history.

(56) References Cited

U.S. PATENT DOCUMENTS

| | | | | |
|---|---|---|---|---|
| 2015/0304506 | A1* | 10/2015 | Zhu ....................... | H04M 15/49 455/406 |
| 2015/0373530 | A1* | 12/2015 | Stein ................... | H04L 63/0853 455/411 |
| 2017/0033823 | A1* | 2/2017 | Smith ..................... | H04W 8/18 |
| 2017/0134945 | A1* | 5/2017 | Goel ..................... | H04W 76/38 |

* cited by examiner

*Primary Examiner* — John J Lee
(74) *Attorney, Agent, or Firm* — Mark M. Friedman (57) ABSTRACT

According to a first aspect of the present disclosed subject matter, a SIM virtualization system, having servers selected from a group comprising of: eSIM server; SIM server; SIMs bank; and any combination thereof, the system comprising: a SIM-Less mobile terminal having hardware configuration selected from a group comprising of: first configuration; second configuration; and a combination thereof, the SIM-Less mobile terminal comprising: a processor configured to execute SIM virtualization functionalities; a single cellular modem capable of communicating over CH-1 and CH-2 with at least one cellular network; and a non-transitory memory capable of retaining: at least one native SIM profile used by the mobile terminal for emulating a SIM selected from a group comprising of: a universal integrated circuit card (UICC); embedded UICC (eUICC); and a combination thereof; at least one virtual SIM profile; and software stack operative to cause the mobile terminal to obtain and authenticate the at least one virtual SIM profile; and wherein the virtual SIM profile is obtained from servers selected from a group comprising of: a SIM server coupled with a SIM bank; eSIM server; and a combination thereof.

20 Claims, 4 Drawing Sheets

SYSTEM AND METHOD FOR SIM VIRTUALIZATION OF SIM AND SIM-LESS MOBILE TERMINALS

This patent application is based on and claims the benefit of the filing date of U.S. Provisional Application Ser. No. 62/409,895, filed Oct. 19, 2016, and Ser. No. 62/414,737, filed Oct. 30, 2016 each of which is incorporated herein by reference in its entirely.

TECHNICAL FIELD

The present disclosed subject matter relates to mobile cellular communications. More particularly, the present disclosed subject matter relates to SIM (Subscriber Identity Module) virtualization SIM-Less and SIM based mobile terminals.

BACKGROUND

Mobile terminals are equipment and or devices; such as handheld cellular phones, tablets, mobile hotspots or any IoT elements; utilizing mobile (wireless) technologies, for example, universal mobile telecommunications system (UMTS), code division multiple access (CDMA) global system for mobile communication, (GSM); Long Term Evolution (LTE); a combination thereof, or the like; for communicating voice and data.

The technologies vary from one carrier network to another, the carrier, i.e. mobile service providers (MSP) require the use of personalizing subscriber identity module (SIM) plug-in card in each mobile terminal. The SIM inserted into mobile terminals contains security algorithms required for authentication, personal information, service level and personal data of the mobile terminal user. The SIM functionality can be retained and implemented on a universal integrated circuit card (UICC) or a substantial part thereof. The UICC is a physical smart card, equipped with processing capabilities as well as memory that retain data and several applications utilized for accessing MSP networks, and the like. Typically, mobile terminals are based on removable UICC, comprising the SIM functionality, which may be replaceable. Emerging technologies introduce embedded UICC (eUICC) for supporting the new GSMA (MSP organization) embedded SIM (eSIM) specification. Unlike the UICC, the embedded UICC (eUICC) isn't removable, it is smaller than the nano SIM and it is permanently assembled in the mobile terminals. The eUICC supports the capability of remote provisioning, i.e. over the air (OTA), such as the GSMA eSIM specification, additionally the eUICC can retain at least one SIM profile and switch between one another. Typically, SIM profiles comprise subscriber information, MSP information, subscription policies, at least one IMSI, IMSIs associated Kc, a combination thereof, or the like.

Mobile terminal; such as mobile phone, smartphone, mobile hotspot, tablet, smart watch, alarm systems, a combination thereof, or the like; employs the (SIM) to identify and authenticate a subscriber in a MSP network. As a standard, SIM comprises a unique secret key value (Kc) used for authenticating a mobile terminal subscriber in any given MSP network. The value Kc is also stored in a repository called authentication center (AuC) of the MSP that provided the SIM to the subscriber. Most mobile terminal around the world adhere to following authentication procedure:

a. Following boot up, the mobile terminal obtains the SIM's international mobile subscriber identity (IMSI) and passes it to an MSP, thus requesting access and authentication.

b. The MSP fetches the IMSI from its AuC, extract its associated Kc, generate an SRES_1 response (Industry term for Certificate challenge) based on the Kc and transmits it back to the mobile terminal.

c. The SIM card of the mobile terminal obtains the SRES_1 and signs it with its own Kc, thus generates response SRES_2, which is passed back to the MSP.

d. The MSP compares its SRES_1 with the SRES_2, returned from the mobile terminal, if they match the SIM is authenticated and the mobile terminal subscriber is granted access to the MSP network.

The services provided by MSPs are often limited, expensive and difficult to change once the subscriber locks into a particular MSP service. MSPs models for voice and data service employ direct charges to the caller, either via an invoice, calling card, credit card or associated charge number. International travelers are charged with high roaming charges for incoming and outgoing calls as well as data usage, on top of the tolls. Practically, international travelers are faced with the options of either buy a local SIM card or use a roaming plan. This is very inconvenient and also costly, especially when traveling to many countries.

In the last three decades, mobile wireless technologies have experience about five generations of technology evolution. Current focus in mobile wireless technology concentrates on advance implementation of 4G technology and 5G technology. First generation (1G) was based on analog cellular networks which contributed, to the mobile technology, the use of multiple cell sites, and the ability to transfer calls from one site to another as a subscriber travelled between cells during a conversation. The 1G was the last mobile analog network; the following generations were all digital generations.

Second generation (2G) was the first digital transmission networks, which primarily used GSM standard. The second generation introduced text messaging (SMS) initially on GSM networks and eventually on all digital networks. General packet radio service (GPRS) is a cellular wireless technology developed in between, 2G, and its successor, 3G. GPRS could provide data rates from 56 kbps up to 115 kbps. The enhanced data rates for GSM evolution (EDGE) is an extended version of GSM, which extended the data transmission to 384 kbps.

Third generation (3G) is a: High speed internet protocol (IP) data networks. The main technological differentiating 3G from 2G is the use of packet switching instead of circuit switching for data transmission. IP packet switching enabled the, later on, development of the universal mobile telecommunications system (UMTS) boosting the data transfer rates and capacity. Current HSDPA deployments support downlink speeds of 1.8 Mbps to 84 Mbps.

Fourth generation (4G) was mainly focused on Growth of mobile broadband. 4G is basically an extension of the 3G technology with more bandwidth and services, coupled with replacement of circuit switching with an all IP network for audio/video streaming as well as Voice over IP (VoIP). The 4G LTE data transfer rate can reach 100 Mbps downstream and 100 Mbps upstream. Fifth generation 5G, is the proposed next mobile communication beyond the 4G, the 5G may aims at higher broadband capacity per user per cell as well as higher consumption rate per month per user.

BRIEF SUMMARY

According to a first aspect of the present disclosed subject matter, a SIM virtualization system, having servers selected from a group comprising of: eSIM server; SIM server; SIMs bank; and any combination thereof, the system comprising: a SIM-Less mobile terminal having hardware configuration selected from a group comprising of: first configuration; second configuration; and a combination thereof, the SIM-Less mobile terminal comprising: a processor configured to execute SIM virtualization functionalities; a single cellular modem capable of communicating over CH-1 and CH-2 with at least one cellular network; and a non-transitory memory capable of retaining: at least one native SIM profile used by the mobile terminal for emulating a SIM selected from a group comprising of: a universal integrated circuit card (UICC); embedded UICC (eUICC); and a combination thereof; at least one virtual SIM profile; and software stack operative to cause the mobile terminal to obtain and authenticate the at least one virtual SIM profile; and wherein the virtual SIM profile is obtained from servers selected from a group comprising of: a SIM server coupled with a SIM bank; eSIM server; and a combination thereof.

In some exemplary embodiments, the SIM-server is configured to allocate virtual SIM for the mobile terminal; and wherein the SIM Bank comprising a plurality of SIMs selected from a group comprising of physical SIM cards; SIMs profiles; and a combination thereof.

In some exemplary embodiments, the software stack further comprises EzFi and eSIM software modules, wherein the EzFi software module provides initial communication and authentication of a mobile phone subscriber with service providers, as further described herein.

In some exemplary embodiments, at the first configuration of the mobile terminal, the processor is an independent application processor; the non-transitory memory is an independent memory; the single cellular modem is selected from the group comprising of: a concurrent stack modem; a nonconcurrent stack modem, and a combination thereof, wherein the concurrent stack modem is capable of simultaneously communicating over CH-1 and CH-2; and wherein the first configuration of the mobile terminal further comprises an AT commands bus and an application protocol data unit (APDU) bus used for communication between the application processor and the single cellular modem.

In some exemplary embodiments, the first configuration of the mobile terminal further comprises a hardware SIM used for initial authentication and a selector, wherein the selector is configured to route the APDU bus between the single cellular modem and either the application processor or the hardware SIM.

In some exemplary embodiments, of the second configuration of the mobile terminal, the processor is a CPU coupled with the non-transitory memory, wherein the CPU and the memory are integral part of the single cellular modem.

In some exemplary embodiments, the CPU and the memory and the single cellular modem are parts of a system on a chip (SoC).

According to another aspect of the present disclosed subject matter, a SIM-Less mobile terminal capable of providing SIM virtualization in systems having servers selected from the group comprising of: eSIM server; SIM server; SIMs bank; and any combination thereof, the SIM-Less mobile terminal comprising: a first configuration; a second configuration, wherein both configurations are comprising: a processor configured to execute SIM virtualization functionalities; a single cellular modem capable of communicating over CH-1 and CH-2 with at least one cellular network; and a non-transitory memory capable of retaining: at least one native SIM profile used by the mobile terminal for emulating a SIM selected from a group comprising of: a universal integrated circuit card (UICC); embedded UICC (eUICC); and a combination thereof; at least one virtual SIM profile; and software stack operative to cause the mobile terminal to obtain and authenticate the at least one virtual SIM profile; and wherein the virtual SIM profile is obtained from servers selected from a group comprising of: a SIM server coupled with a SIM bank; eSIM server; and a combination thereof.

In some exemplary embodiments, the SIM-server is configured to allocate virtual SIM for the mobile terminal; and wherein the SIM Bank comprising a plurality of SIMs selected from a group comprising of physical SIM cards; SIMs profiles; and a combination thereof.

In some exemplary embodiments, the software stack further comprises EzFi and eSIM software modules.

In some exemplary embodiments, at the first configuration of the mobile terminal, the processor is an independent application processor; the non-transitory memory is an independent memory; the single cellular modem is selected from the group comprising of: a concurrent stack modem; a nonconcurrent stack modem, and a combination thereof, wherein the concurrent stack modem is capable of simultaneously communicating over CH-1 and CH-2; and wherein the first configuration of the mobile terminal further comprises an AT commands bus and an application protocol data unit (APDU) bus used for communication between the application processor and the single cellular modem.

In some exemplary embodiments, the first configuration of the mobile terminal further comprises a hardware SIM used for initial authentication and a selector, wherein the selector is configured to route the APDU bus between the single cellular modem and either the application processor or the hardware SIM.

In some exemplary embodiments, at the second configuration of the mobile terminal, the processor is a CPU coupled with the non-transitory memory, wherein the CPU and the memory are integral part of the single cellular modem.

In some exemplary embodiments, the CPU and the memory and the single cellular modem are parts of a system on a chip (SoC).

According to yet another aspect of the present disclosed subject matter, a SIM virtualization method for SIM-Less mobile terminal, having a touchscreen display and a modem with concurrent stack capabilities, the method comprising: activating an EzFi software module; initiating bootstrap authentication of the mobile terminal using an IMSI1 of a first SIM profile with a first mobile network, wherein the first SIM profile is obtained from the EzFi software module; establishing connection with the first mobile network over channel one upon verifying that an SRES_2 response calculated by the EzFi software module matches an SRES_1 challenge sent by the first mobile network; obtaining a second SIM profile from a SIM-server coupled with a SIM bank via channel one and the first mobile network, and retain the second SIM profile in the EzFi software module; authenticating the mobile terminal with a second mobile network, by simultaneously passing an IMSI2, via channel two to the second mobile network, wherein the IMSI2 is retrieved from the second SIM profile; establishing connection with the second mobile network over channel two upon verifying that an SRES_2 response calculated by the EzFi software module an SRES_1 challenge sent by the second mobile network.

In some exemplary embodiments, the obtain a second SIM profile from a SIM-server coupled with a SIM bank further comprising: establishing connection with an eSIM server over first mobile network and channel one and obtaining a second SIM profile from the eSIM-server and retaining the second SIM profile in the EzFi software module; obtaining a third SIM profile from a SIM-server coupled with a SIM bank via channel one and the first mobile network, and retain the third SIM profile in the EzFi software module; authenticating the mobile terminal with a second mobile network, by simultaneously passing an IMSI3, via channel two to the second mobile network, wherein the IMSI3 is retrieved from the third SIM profile; establishing connection with the second mobile network over channel two upon verifying that an SRES_2 response calculated by the EzFi software module an SRES_1 challenge sent by the second mobile network.

In some exemplary embodiments, the EzFi software module launches a user's interface application for displaying and selecting a roaming mobile service provider from a menu comprising a plurality of mobile service providers, wherein the menu is displaying on the mobile terminal touchscreen display, and wherein a user selects a roaming mobile service provider for the second SIM profile by the touchscreen display.

According to yet another aspect of the present disclosed subject matter, a SIM virtualization method for SIM-Less mobile terminal having a touchscreen display, the method comprising: activating an eSIM software module; initiating bootstrap authentication of the mobile terminal using an IMSI1 of a first SIM profile with a first mobile network, wherein the first SIM profile is obtained from the eSIM software module; establishing connection with the first mobile network over channel one upon verifying that an SRES_2 response calculated by the eSIM software module matches an SRES_1 challenge sent by the first mobile network; obtaining a second SIM profile from an eSIM-server via channel one and the first mobile network, and retain the second SIM profile in the eSIM software module; authenticate the mobile terminal with a second mobile network, by passing an IMSI2, via channel two to the second mobile network, wherein the IMSI2 is retrieved from the second SIM profile; establishing connection with the second mobile network over channel two upon verifying that an SRES_2 response calculated by the eSIM software module an SRES_1 challenge sent by the second mobile network.

In some exemplary embodiments, the eSIM software module launches a user's interface application for displaying and selecting a roaming mobile service provider from a menu comprising a plurality of mobile service providers, wherein the menu is displaying on the mobile terminal touchscreen display, and wherein a user selects a roaming mobile service provider for the second SIM profile by the touchscreen display.

In some exemplary embodiments, the first SIM profile is obtained from the EzFi software module.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

It should be noted that in the present disclosure the term "home network" refers to a geographical coverage area, of any type of cellular communication. All mobile terminal subscribers are provisioned and registered in the SIM profile, by a mobile service provider, wherein each SIM profile is associated to a specific mobile terminal.

The term "roaming network" refers to a network that exceeds the geographical coverage area of the home network. Typically, the difference between roaming and home networks may be designated by country, PSTN area code, carrier, a combination thereof, or the like. It should also be noted that, SIM virtualization is the process of altering a SIM profile of a mobile terminal, that is present in roaming network, into a SIM profile of the roaming network, and thus communicating in rates of a home network.

One technical solution provided by the present disclosure is providing SIM virtualization capability to 2G, 3G, 4G and 5G mobile terminals that have only one modem and doesn't comprise SIM card socket, UICC, eUICC. The present disclosure is configured to provide SIM virtualization to mobile terminals that support EzFi and eSIM technologies (to be described below), as per the eSIM specification by GSMAs. In some exemplary embodiments, an eUICC functionality may be implemented and executed, in firmware, by an application processor, a modem, a combination thereof, or the like.

Another technical solution provided by the present disclosure is providing, commercially available, mobile Wi-Fi hotspot or other mobile terminal equipment, with SIM virtualization capability. It should be noted that the SIM virtualization technology is agnostic to the SIM capability of the commercially available equipment. Thus, the SIM virtualization of the present disclosure may be deployed on mobile terminals having one or more hardware SIMs, eSIM, SIM-Less, a combination thereof, or the like.

Yet another technical solution of the present disclosure is utilizing the application processor of the mobile terminal or external application processor for executing SIM virtualization process. In some exemplary embodiments, the SIM virtualization functionality may be deployed to and executed by the modem, and or an SOC of the mobile terminal. In some exemplary embodiments, the SIM virtualization functionality of the present disclosure may be utilized with modems that support concurrent stack, such as dual sim dual active (DSDA) and dual sim dual standby (DSDS).

One technical effect of utilizing the disclosed subject matter enables mobile terminal and chipset manufacturers to easily integrate SIM-Less modem into their (printed circuit board (PCB) or system on a chip (SoC).

Another technical effect of utilizing the disclosed subject matter is reducing power consumption by eliminating the need for hardware SIM cards, UICC, eUICC and additional modems. Consequently, such elimination yield PCB real-estate relief, cost reduction as well as shorter development time, which are critical for mobile terminal equipment.

Yet another technical effect of utilizing the disclosed subject matter alleviates mobile terminal's users that utilize the present disclosure from: the need to switch a SIM card during international roaming and international roaming cost.

In addition, switching between operators can be done by the user in one click, instead of a long process of registering a new SIM card; users also enjoy the freedom to choose MSP with appropriate coverage of a particular area.

Yet another technical effect of utilizing SIM virtualization of the present disclosure is: eliminating the need for employing two cellular modems in one mobile terminal for the sake of implementing virtual SIM technology. Additionally, the present disclosure can be agnostic to the mobile terminal's operating system and type of SIM.

Yet another technical effect of utilizing the present disclosure SIM virtualization is: maintaining two separate communication channels by running two protocol stacks concurrently. For example, GSM protocol stack and LTE protocol stack or 2 GSM protocol stacks, one for voice and one for data.

Figure 1:
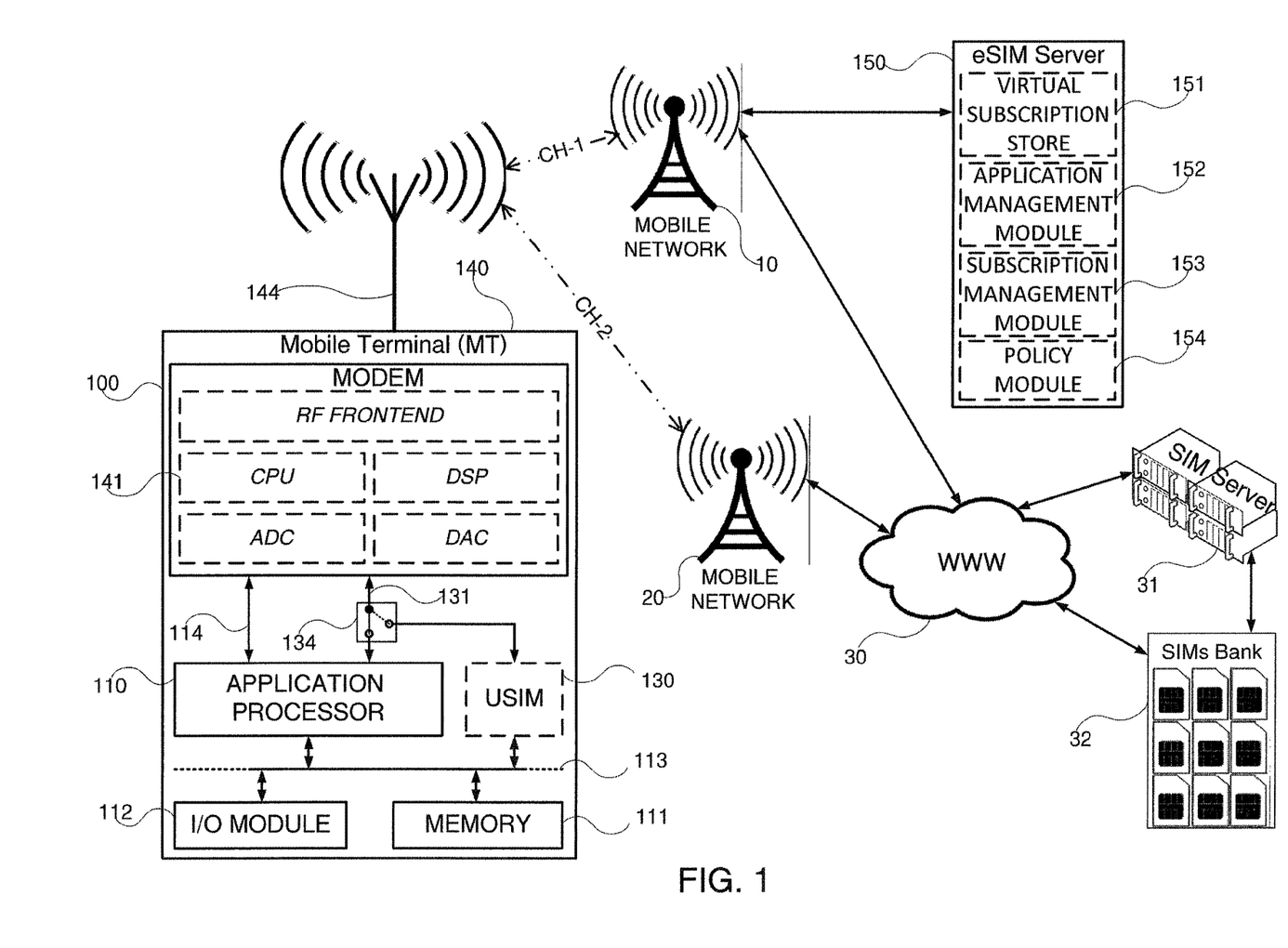
FIG. 1 shows a block diagram of a mobile terminal, in a mobile network (MN) environment and SIM virtualization supporting elements, in accordance with some exemplary embodiments of the disclosed subject matter.

Referring now to FIG. 1 showing a block diagram of a mobile terminal 100, in a mobile network (MN) environment and SIM virtualization supporting elements, in accordance with some exemplary embodiments of the disclosed subject matter.

Mobile terminal 100 may be a computerized apparatus; such as mobile phone, smartphone, mobile hotspot, tablet, smart watch, alarm systems, machine to machine, a combination thereof, or the like.

In some exemplary embodiments, the mobile terminal 100 may comprise an application processor 110. The application processor 110 may be a central processing unit (CPU), a microprocessor, an electronic circuit, a plurality of integrated circuits (IC), a combination thereof, or the like. In some exemplary embodiments, the application processor 110 may be implemented on a dedicated SoC or a part of an SoC of the mobile terminal 100. The application processor 110 may be utilized to perform computations required by the mobile terminal 100, or any of it subcomponents, to perform methods, such as depicted in FIGS. 4A-4D, for acquiring at least one virtual-SIM (to be described below) and authenticate the mobile terminal 100 with at least one MSP network.

In some exemplary embodiments of the disclosed subject matter, mobile terminal 100 may comprise an input-output (I/O) module 112. The I/O module 112 may be utilized as an interface to transmit and/or receive information and instructions between application processor 110 and internal subsystems or external subsystems (not shown), such as display, Wi-Fi, module, audio components, sensors, actuators, keyboard, touch-screen, augmented reality glasses, external devices, a combination thereof, or the like. All of which may be used to provide a user's interface capabilities such as, data entry inputs, commands inputs, outputs, visualized images, reports, a combination thereof, or the like.

Additionally, or alternatively, the internal or external subsystems may comprise connectivity components, such as modems, at list one SIM card, and radio transceivers, used to perform connectivity tasks; such as Wi-Fi, cellular communication, or the like.

In some exemplary embodiments, the mobile terminal 100 may comprise a memory 111. The memory 111 may be a hard disk drive, a flash disk, a random-access memory (RAM), a memory chip, a flash memory, a combination thereof, or the like. In some exemplary embodiments, memory 111 may be used to retain software components, operating system, program, applications, instructions, functions, and source code files that are operative to cause the application processor 110 and or modem 140 to perform acts associated with the mobile terminal 100 and any of the subcomponents to perform methods such as depicted in FIGS. 4A-4D.

In some exemplary embodiments, the mobile terminal 100 may comprise a modem 140. The modem 140 may be a commercially available component, such as a chipset, a device, an electronic circuit, a plurality of integrated circuits (IC), a combination thereof, SoC, or the like. The modem 140 may also comprise cellular radio frequency (RF) frontend configured for transceiving, via antenna 144, information (voice and data) over cellular radio bands that comply with cellular radio technologies incorporated in digital cellular generations, i.e. 2G, 3G, 4G, LTE, 5G generations of cellular networks. Additionally, or alternatively, modem 140 may comprise a digital signal processor (DSP), a digital to analog converter (DAC), analog to digital converter (ADC), a combination thereof, or the like. The DSP, DAC and ADC may be utilized for transceiving information over cellular radio bands that comply with cellular radio technologies.

In some exemplary embodiments, modem 140 may comprise at least one CPU 141 configured to perform computations required by the mobile terminal 100, or any of it subcomponents, to perform methods, such as the computations performed by application processor 110. It should be noted that CPU 141 further comprises a memory module (not shown), such as memory 111, for retaining software files operative to cause modem 140 to perform acts associated with the mobile terminal 100 and any of the subcomponents and perform methods such as depicted in FIGS. 4A-4D.

In some exemplary embodiments, the modem 140 may be capable of communicating simultaneously with at least two mobile networks of different or same MSP. To do so, modem 140 may comprise a concurrent protocol stack capability, which allows for simultaneous communication over CH-1 and CH-2. In some exemplary embodiments, the modem 140 may be configured to perform concurrent communication over at least one RF channel, utilizing time division multiplexing (TDM) technology. Alternatively, TDM may not be utilized if modem 140 utilizes two separate RF channels. For example, a modem 140 that comprise concurrent stack capability may be able to execute GSM protocol stack and LTE protocol stack concurrently, so GSM RAT (Radio Access Technology) could be used to establish CH-1, while LTE RAT could be used to establish CH-2 simultaneously.

In some exemplary embodiments, modem 140 may support eSIM protocol. As well as concurrent protocol stack capability. As an example, such modem can have an ability to execute two different LTE protocol stacks concurrently. In some exemplary embodiments, such modem allows for simultaneous communication over CH-1 and CH-2 and may be utilized to provide the features depicted in the present disclosure.

In some exemplary embodiments, the mobile terminal 100 may comprise a hardware SIM (HW-SIM) 130. The HW-SIM 130 may be a SIM card having several form factors, such as mini, micro, nano, a combination thereof, or the like. The UICC 130 may be a smart card comprised of a CPU, I/O circuits and memory components that retain applications, such as SIM applications as well as at least one subscriber and at least one MSP profiles. In some exemplary embodiments, HW-SIM 130 may be a removable card provided and provisioned by the MSP, such as the commercially available mobile terminals have. Additionally, or alternatively, some mobile terminals may be provided with embedded (permanently connected) HW-SIM 130, wherein the provisioning may be done OTA by MSP of choice. It should be noted that, such provisioning may be executed in accordance with the eSIM protocol of the GSMA.

In preferred SIM virtualization embodiments of the present discloser, mobile terminal 100 may be a SIM-Less mobile terminal (also known herein as SIM-Less modem) Thus, mobile terminal 100 may be lacking any hardware SIM or eSIM, which will be replaced by software emulation. In such exemplary embodiments, the SIM profile of the subscriber; comprising subscriptions policies, at least one IMSI and IMSIs associated Kc; may be retained in the mobile terminal memory or in a memory (not shown) of CPU 141. Whereas the SIM (USIM or eUSIM) functionalities may be conducted by application processor 110, modem 140, a combination thereof, or the like.

In some exemplary embodiments, the mobile terminal 100 may comprise a plurality of internal communication buses; such as bus 113, bus 114 and bus 131. Both buses 114 and 131 may be serial communication buses, such USB, RS232, or the like, configured to pass commands and status between AP110 and modem 140 and between modem 140 and HW-SIM 130 respectively. Typically, the communication protocol used on bus 114 adhere to the AT commands protocol, whereas the protocol used on bus 131 adhere to the application protocol data unit (APDU).

In some exemplary embodiments of the disclosed subject matter, mobile terminal 100 may comprise a selector 134, configured to connect bus 131 between modem 140 and either application processor 110 or HW-SIM 130. In some exemplary embodiments, selector 134 may be implemented in firmware, hardware and a combination thereof; and activated by either application processor 110 or modem 140. In SIM-Less embodiments, selector 134 may connect bus 131 between modem 140 and application processor 110, since the application processor 110 replaces the HW-SIM 130 duties. Alternatively, selector 134 may connect bus 131 between modem 140 and HW-SIM 130 when the last is present, i.e. In SIM-base embodiments.

In some exemplary embodiments, bus 113 may be a serial bus, such as media-independent interface (MII), or a parallel bus and may be used for communication between I/O module 112, memory 111, HW-SIM 130, application processor 110, a combination thereof, or the like.

In some exemplary embodiments of the disclosed subject matter, mobile terminal 100 may communicate over at least one channel, such as channel one (CH-1) and channel two (CH-2), with at least one cellular mobile networks, such as first mobile network (MN-1) and second mobile network (MN-2) via antenna 144. Each MN may comprise a plurality of cells, operated by different MSPs or the same MSP, wherein each of which has the capability of connecting with the Internet WWW 30. Furthermore, each MN may support 2G, 3G, 4G or 5G generations, voice and data traffic.

Additionally, or alternatively, each MN may comprise an eSIM server 150. The eSIM 150 server may be a general-purpose computer that runs different software modules to implement eSIM protocol. an eSIM server 150 may be located inside any MN domain or outside the domain, preferably in Internet cloud hosting, such as amazon web services (AWS).

The eSIM server 150 may be used for remote provisioning and management of mobile terminals, allowing over the air (OTA) provisioning of an initial mobile service provider (MSP) subscription, as well as subsequent change of subscription from one MSP to another. In some exemplary embodiments, eSIM server 150 may be used for bootstrap connection in a process of initial authentication of mobile terminal 100 with MN-1.

In some exemplary embodiments, the software modules of eSIM server 150 may comprise: a subscription management 153; an application management 152; a virtual subscription store 151; and a policy module 154. The subscription management 153 may be software module utilized for implementing subscription manager secure routing and subscription manager data preparation according to the GSMA's technical specification for eUICC (GTSEU). The application management 152 may be a software module used for managing different parts of eSIM protocols. The virtual subscription store 151 may be a software module utilized for implementing the store that presents subscribers with several options for cellular subscriptions to choose from. In some exemplary embodiments, subscribers connecting to the store using web browser or application on the mobile terminal 100. The software policy module may implement policies that corresponds with a subscription profile, which is download to mobile terminals.

The eSIM server 150 may be used for remote provisioning and management of mobile terminals, allowing over the air (OTA) provisioning of an initial mobile service provider (MSP) subscription, as well as subsequent change of subscription from one MSP to another. In some exemplary embodiments, eSIM server 150 may be used for bootstrap connection for initial authentication of mobile terminal 100 with MN-1.

In some exemplary embodiments, the SIM virtualization supporting elements may comprise a SIM server 31 and SIMs bank 32. SIM-server 31 may be used as a central management unit operative to provide mobile terminals, such as mobile terminal 100, with at least one virtual SIM and authenticate it with MN1, MN2, a combination thereof, or the like. The SIM-server 31 may be deployed on a cloud computing service, such as AWS, and may utilize a SIM bank 32 that enables storage of a plurality of SIM cards.

In some exemplary embodiments, SIM bank 32 may comprise a plurality of physical SIM cards, a plurality of SIM profiles stored in a repository of the SIM bank 32 (not shown), a combination thereof, or the like. It should be noted that SIM bank 32 may be an integral part of SIM-server 31, physically connected (external) to SIM-server 31, connected to SIM-server 31 via the Internet WWW 30, a combination thereof, or the like. It will be appreciated that SIM bank 32 facilitates SIM-server 31 in the process of allocating and authenticating virtual SIM. Thus, for the sake of convenience, wherever "SIM-server 31" is mentioned throughout the present disclosure it's also includes SIM bank 32. In some exemplary embodiments, a mobile terminal of the present disclosure communicates with SIM-server 31 and SIM bank 32 for allocating a virtual SIM profile and authenticating the virtual SIM profile may be based on actual SIM profiles and or physical SIMS stored and or comprised within the SIM bank 32 and or a combination thereof.

Figure 2:
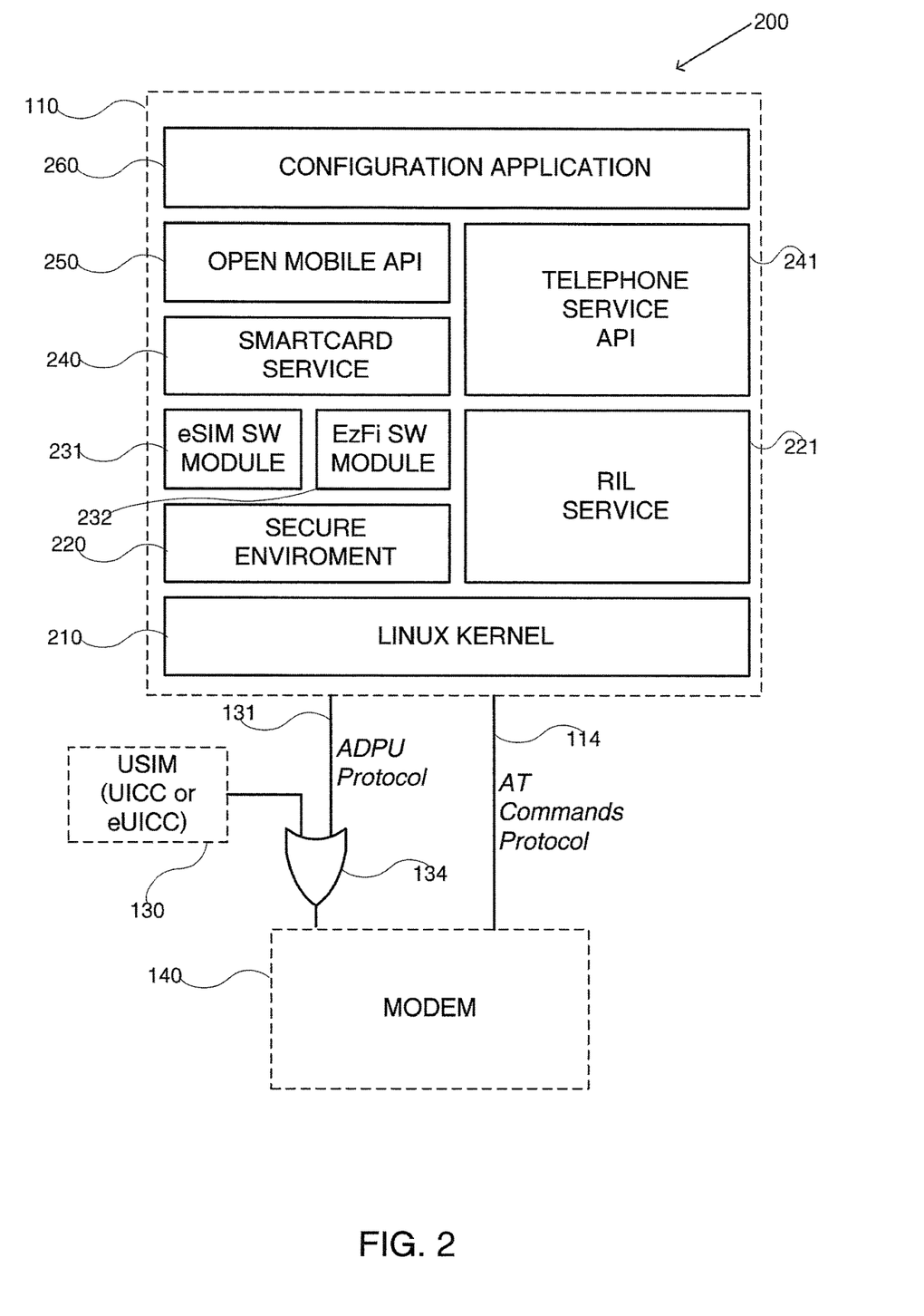
FIG. 2 shows a mobile terminal first configuration diagram, comprising an application processor, in accordance with some exemplary embodiments of the disclosed subject matter.

Referring now to FIG. 2 showing a mobile terminal first configuration 200 diagram, comprising an application processor, in accordance with some exemplary embodiments of the disclosed subject matter.

It should be noted that, the first configuration diagram depicted in FIG. 2 refers to mobile terminal 100 that comprises hardware SIM (UICC or eUICC). The software and firmware components described in the stack diagram may comprise software modules, operating system, program, applications, instructions, functions, and source code files that are operative to cause the application processor 110 and/or modem 140 to perform acts associated with the mobile terminal 100 and any of the subcomponents to perform SIM virtualization methods, such as depicted in FIGS. 4A-4D.

In some exemplary embodiments, application processor 110, such as described in FIG. 1 above, may be a single or multicore processor operated by operating system (OS), such as Android, iOS, or the like. The software and firmware stack required by application processor 100 to perform acts associated with the mobile terminal 100 may be retained in internal memory, memory 111 of FIG. 1, a combination thereof, or the like. In some exemplary embodiments, the OS may be based on Linux kernel 210, usually customized by mobile terminals manufacturers. The software and firmware stack may also comprise secure environment module. 220; radio interface layer (RIL) 221; eSIM software module 231; EzFi software module 232; smartcard service; 240; open mobile application program interface (API) layer 250. telephone service API 241; configuration application 260; a combination thereof, or the like.

It should be noted that, the configurations depicted in the present disclosure, in general, and in FIG. 2 and in particular, refers to embodiments of mobile terminals utilizing an open source OS such as Android, as an example. However, the present disclosure may be provided and deployed on mobile terminals, which are utilizing different OS, such as iOS, windows phone (WP), or the like.

The secure environment module 220 may be a java virtual machine or secure data container utilized to provide secure environment for eSIM and EzFi modules, so the secret keys and authentication algorithms stored in these modules could not be compromised.

The RIL 221 may provide an interface between the hardware's radio and modem of mobile terminals 100 and Android telephony services 241. In some exemplary embodiments, RIL 221 may comprise a RIL daemon and a RIL vendor. The RIL daemon communicates with telephony services and dispatches solicited commands to the vendor RIL. The RIL vendor may be specific to a particular radio implementation, and dispatches unsolicited commands to the RIL daemon.

It should be noted that the term "SIM-Less modem" refers in the present disclosure to mobile terminals that doesn't comprise neither UICC nor eUICC, no hardware SIM card. In such SIM-Less modem, the content as well as the functionalities of traditional UICC or eUICC may be retained and emulated in software.

In some exemplary embodiments, the eSIM software module 231 may emulate the UICC or eUICC in software as well executing embedded SIM technology protocol in mobile terminal 100 (client side). Additionally, or alternatively, eSIM module 231 may provide and implement the following tasks:
   a. Issuer security domain registry (ISD-R);
   b. Control flow and logic application;
   c. Profile manager;
   d. ISD-profile (ISD-P), bootstrap profile for IMSI1 to establish first connection.
   e. ISD-P, IMSI2 for establishing second connection.
   f. SIM profile data selection.
   g. Generate secret keys (Kc) to be stored in ISD-Ps.

In some exemplary embodiments, the EzFi software module 232 may emulate the UICC or eUICC in software as well executing embedded SIM technology protocol in mobile terminal 100 (client side). Additionally, or alternatively, EzFi module 232 may provide and implement the following tasks:

a. Maintaining SIM registry of SIM profile data, such as IMSI, IMSDN and keys.
    b. Bootstrap roaming profile for IMSI1, which comprises Kc to establish initial (first) connection
    c. Fetching and retaining IMSI2 for establishing second connection.
    d. Implementing RATs authentication procedures.
    e. Implementing applets, such as USIM applet.
    f. Control flow and logics application.

The smartcard service 240 may be used for implementing open mobile API 250, which provides API for android applications for communicating with UICC or eUICC. The telephone service API 241 may provide API for android applications for phone cellular service. In some exemplary embodiments, the configuration application 260 may be a proprietary android application adopted to provide users with interface for configuring modes of operation of the mobile terminal 100.

In some exemplary embodiments, bus 114 supports serial communication, based on AT commands protocol, between the application processor 110 and modem 140, such as depicted in FIG. 1. Additionally, bus 131 supports serial communication, based on ADPU protocol, between modem 140 and either the application processor 110 or HW-SIM 130, such as depicted in FIG. 1.

Figure 3:
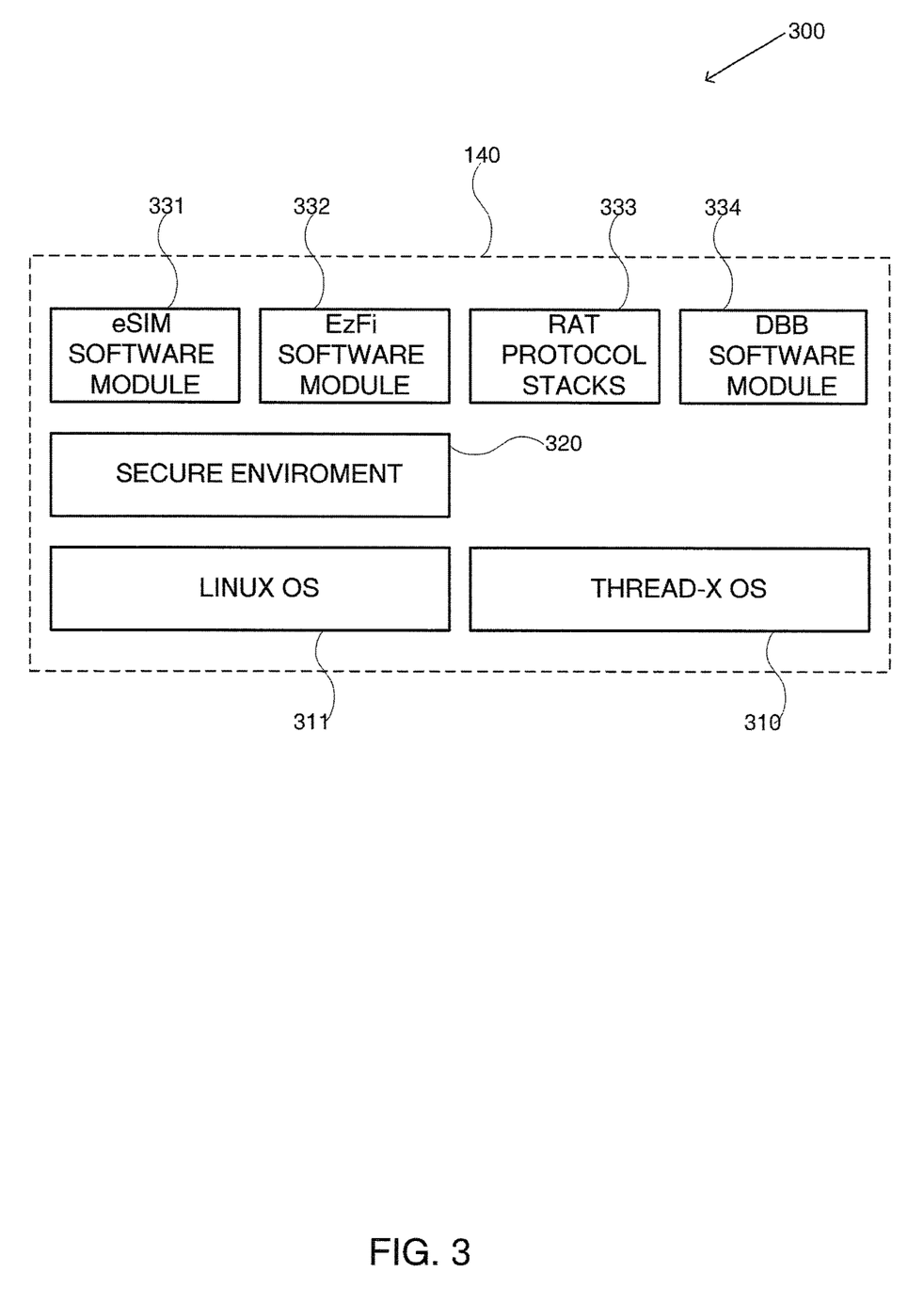
FIG. 3 shows a mobile terminal second configuration diagram, comprising a modem with processing capabilities, in accordance with some exemplary embodiments of the disclosed subject matter.

Referring now to FIG. 3 showing a mobile terminal second configuration 300 diagram, comprising a modem with processing capabilities, in accordance with some exemplary embodiments of the disclosed subject matter.

It should be noted that, the second configuration diagram depicted in FIG. 3 refers to mobile terminal 100 that doesn't comprise any hardware SIM (SIM-Less). Thus, all SIM functionalities, as known in the art may be performed in software by modem 140 and its subcomponents. In some exemplary embodiments, the software and firmware components described in the stack diagram may comprise software modules, operating system, program, applications, instructions, functions, and source code files that are operative to cause modem 140 to perform acts associated with the mobile terminal 100 and any of the subcomponents to perform SIM virtualization methods, such as depicted in FIGS. 4A-4D.

In some exemplary embodiments, a SIM-Less modem, such as the modem 140 described in FIG. 1 above, may comprise processor, such as CPU 141 of FIG. 1, which is operated by operating system (OS), such as Android, iOS, or the like. The software and firmware stack required by the SIM-Less modem to perform acts associated with the mobile terminal 100 may be retained in internal memory of the SIM-Less modem. In some exemplary embodiments, the OS may be based on Application OS, such as Linux OS 311, and a real-time OS, such as ThreadX OS 310, a combination thereof, or the like. In some exemplary embodiments, OS running on the SIM-Less modem may be customized by mobile terminals manufacturers.

The software and firmware stack may also comprise secure environment module. 320; eSIM software module 331; EzFi software module 332; radio access technology (RAT) protocol stack 333; digital base band (DBB) software modules 334; a combination thereof, or the like.

The secure environment module 320 may be a Java virtual machine or secure data container utilized to provide secure environment for eSIM and EzFi modules, so the secret keys and authentication algorithms stored in these modules could not be compromised.

In some exemplary embodiments, the eSIM software module 331 may emulate the UICC or eUICC in software as well executing embedded SIM technology protocol in mobile terminal 100 (client side). Additionally, or alternatively, eSIM module 331 may provide and implement the following tasks:

a. Issuer security domain registry (ISD-R).
    b. Control flow and logics application.
    c. Profile manager.
    d. ISD-P, bootstrap profile for IMSI1 to establish first connection.
    e. ISD-P, IMSI2 for establishing second connection.
    f. SIM profile data selection.
    g. Generate secret keys (Kc) to be stored in ISD-Ps.

In some exemplary embodiments, the EzFi software module 332 may emulate the UICC or eUICC in software as well executing embedded SIM technology protocol in mobile terminal 100 (client side). Additionally, or alternatively, EzFi module 332 may provide and implement the following tasks:

a. Maintaining SIM registry of SIM profile data, such as IMSI, IMSDN and keys.
    b. Bootstrap roaming profile for IMSI1, which comprises Kc to establish initial (first) connection
    c. Fetching and retaining IMSI2 for establishing second connection.
    d. Implementing RATs authentication procedures.
    e. Implementing USIM applets.
    f. Control flow and logics application.

The RAT protocol stacks 333 may be software modules used for implementing communication in networks supporting 2G, 3G, 4G and 5G. The DBB software modules 334 are used for baseband related tasks Referring now to FIGS. 4A-4D showing a flowchart diagrams of methods for acquiring and authenticating virtual-SIM, in accordance with some exemplary embodiments of the disclosed subject matter.

It should be noted that, the methods described herein refers to, but not limited to, mobile terminals based on SIM-Less modem in both first and second configurations, such as depicted in FIGS. 2 and 3 for the mobile terminal 100, of FIG. 1.

In some exemplary embodiments of the disclosed subject matter, each method may be a sequence of operations for acquiring a virtual-SIM profile for mobile terminal 100 and authenticate it with an MSP of a roaming network. In embodiments where the mobile terminal is configured with first configuration 200, the sequence of operations may be conducted by the application processor 110 assisted by sub components of mobile terminal 100, as described in FIGS. 1 and 2. However, embodiments where the mobile terminal is configured with second configuration 300, the sequence of operations may be conducted by CPU 141 assisted by the sub components of modem 140, as described in FIGS. 1 and 3.

The methods may be based on EzFi sequence, eSIM sequence, combined eSIM and EzFi sequence, or the like. In some exemplary embodiments, either one of the sequences may be configured by a mobile terminal user of the present disclosure. Additionally, the sequences may be preconfigured by the mobile terminal manufacturer and activated according to a predetermined policy. Alternatively, the sequences may be configured by the MSP and activated according to a predetermined policy.

In some exemplary embodiments, policies used, by mobile terminal 100, for electing a method out of the method listed below, may be based on criteria's, such as signal strength, manufacturer policy, MSP policy, cost considerations a combination thereof, or the like.

Figure 4A:
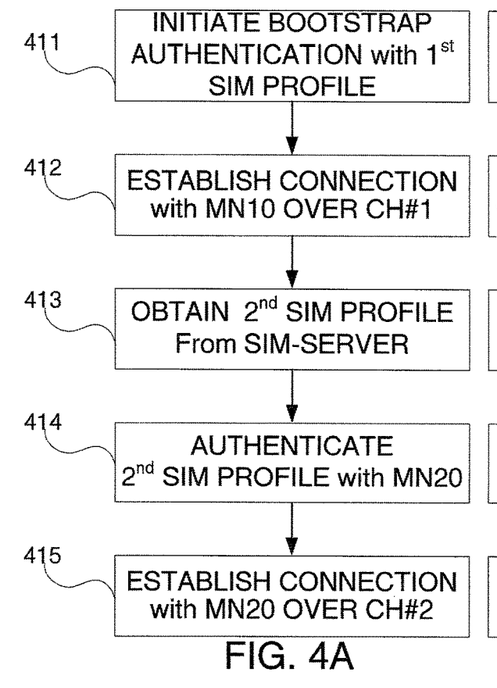
FIGS. 4A-4D shows a flowchart diagrams of methods for acquiring and authenticating virtual-SIM, in accordance with some exemplary embodiments of the disclosed subject matter.

In the EzFi sequence, as depicted in FIG. 4A, a bootstrap roaming profile of the EzFi software module may be utilized to gain access (initial communication) to MN 10 over CH-1. Subsequently, enabling SIM virtualization process by means of SIM server 31. It should be noted that modem 140 may utilize concurrent stack capabilities in this sequence.

It should be noted that, in the present disclosure, a first SIM profile may be a SIM profile, containing, IMSI1 of mobile terminal 100 native-SIM, i.e. SIM profile used by the mobile terminal in the subscriber's home network, covered by the MSP that provided the native-SIM. It should also be noted that the terms, native-SIM profile, bootstrap profile and bootstrap roaming profile are used loosely, in the present disclosure, however they are all refer to: first SIM profile as described above. In some exemplary embodiments, mobile terminal 100 may comprise a plurality of first SIM profiles, each having an IMSI of a different MSP, e.g. ATT, Verizon, T-Mobile, etc. In such embodiments, an appropriate first SIM profile, out of the plurality of first SIM profiles, may be elected, for initial communication, based on criteria's, such as geographical coverage, signal strength, manufacturer policy, MSP policy, cost considerations a combination thereof, or the like.

In first configuration 200 exemplary embodiments, an appropriate first SIM profile may be a software file retained in eSIM software module 231, EzFi software module 232, a combination thereof, or the like. In second configuration 300 exemplary embodiments, the first SIM profile may be a software file retained in eSIM software module 331, EzFi software module 332, a combination thereof, or the like. It should be noted that, in the present disclosure, a second and third SIM profile may be a virtual SIM profile.

In step 411, bootstrap authentication with first SIM profile may be initiated. In some exemplary embodiments, mobile terminal (MT) 100 may obtain an IMSI1, from the first SIM profile of either EzFi software module 332 or 232, and pass it through modem 10 and via CH-1 to an available MSP in MN-1, in order to authenticate MT100 with MN-1. Upon acquiring the IMSI1, the MN-1 challenge the MT100 with an SRES_1.

In step 412, connection with MN-1 may be established over CH #1. In some exemplary embodiments, either EzFi software module 232 or EzFi software module 332 (depend on the configuration) may run RATs authentication procedures to determine an SRES_2 response to NM10. Upon responding, by MT100, with SRES_2 and a proper match between SRES_1 and SRES_2, MN-1 grants MT100 access to MN-1 (connection established).

In step 413, a second SIM profile may be obtained from SIM-server. In some exemplary embodiments, EzFi software module 332 or 232 of MT100 may communicate with SIM-server 31 via CH-1 and thru WWW30, to request IMSI2 for a second SIM profile. Following the request, the SIM-server 31 may reply to MT100 with an IMSI2 via the same path the request arrived. Upon obtaining the IMSI2, the EzFi software module 332 or 232 retain the EMSI2 in a second SIM profile storage.

In step 414, the second SIM profile may be authenticated with MN-2. In some exemplary embodiments, the EzFi software module 332 or 232 may retrieve the IMSI2 from the second SIM profile storage and pass it to modem 140, having a concurrent stack capability, initiating connection with MN-2 via CH-2. Subsequently, MN-2 may reply to the MT100 with an SRES_1 challenge. In some exemplary embodiments, the EzFi software module 332 or 232 fetch the SRES_1 and run RATs authentication procedures to determine an SRES_2 response to NM20. Upon responding, by MT100 via CH-2, with SRES_2 and a proper match between SRES_1 and SRES_2, MN-2 grants MT100 access to MN-2 (authentication completed).

In step 415, connection with MN-2 may be established over CH-2. In some exemplary embodiments, the EzFi software module 332 or 232 may configure modem 140 to use CH-2 as the default connection for data traffic.

It should be noted that, in the case of repeated authentication requests by NM10, steps 411 to 413 may be repeated. Whereas, repeated authentication requests by NM20 only steps 414 to 415 may be repeated.

Figure 4B:
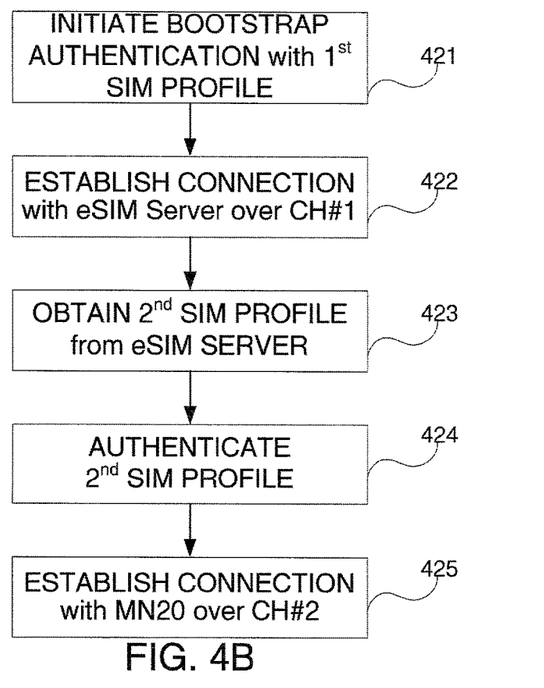

In the eSIM sequence, as depicted in FIG. 4B, a bootstrap profile of the eSIM software module may be utilized to gain access to MN 10 over CH-1. Subsequently, enabling SIM virtualization process by means of eSIM server 150.

In step 421, bootstrap authentication with an appropriate first SIM profile may be initiated. In some exemplary embodiments, mobile terminal (MT) 100 may obtain an IMSI1, from the first SIM profile of either eSIM software module 331 or 231, and pass it through modem 10 and via CH-1 to an available MSP in MN-1, in order to authenticate MT100 with MN-1. Upon acquiring the IMSI1, the MN-1 challenge the MT100 with an SRES_1.

In step 422, connection with eSIM server 150 may be established over CH #1. In some exemplary embodiments, either eSIM software module 331 or 231 (depend on the configuration) may run RATs authentication procedures to determine an SRES_2 response to eSIM server 150. Upon responding, with SRES_2 and a proper match between SRES_1 and SRES_2, MT100 is granted access to MN-1 (CH-1 connection established).

In step 423, a second SIM profile may be obtained from eSIM server 150. In some exemplary embodiments, either eSIM software module 331 or 231 may communicate with eSIM server 150 via CH-1 to request IMSI2 for a second SIM profile. Following the request, the eSIM server 150 may submit to MT100 a menu, from virtual subscription store 151, with options for cellular subscriptions plans to choose from. In some exemplary embodiments, the menu may be presented on a display (not shown) of the MT100, so a user may select an appropriate SIM virtualization plan. In other exemplary embodiments, the SIM virtualization plan may be determined automatically, based on: MT100 hardware capabilities, MT100 configuration, MSP network policy (defined in policy module 154 of the eSIM server) a combination thereof, or the like. Upon SIM virtualization plan selection, either eSIM software module 331 or 231 may communicate with subscription manager 153, of eSIM server 150, to obtain and retain IMSI 2 in the second SIM profile.

In step 424, the second SIM profile may be authenticated. In some exemplary embodiments, either eSIM software module 331 or 231 may retrieve the IMSI2 from the second SIM profile storage and initiate connection with MN-2 via CH-2. Subsequently, MN-2 may reply to the MT100 with an SRES_1 challenge, which will run a control application, of the eSIM software module 331 or 231, to determine an SRES_2 response to eSIM server 150.

In step 425, connection with MN-2 may be established over CH-2. In some exemplary embodiments, a proper match between SRES_1 and SRES_2, allows eSIM server 150 to grant MT100 access to MN-2. Subsequently, either eSIM software module 331 or 231 may configure modem 140 to use CH-2 as the default connection for data traffic. (CH-2 connection established)

It should be noted that, in the case of repeated authentication requests by NM10, steps 421 to 423 may be repeated. Whereas, repeated authentication requests by NM20 only steps 424 to 425 may be repeated.

Figure 4C:
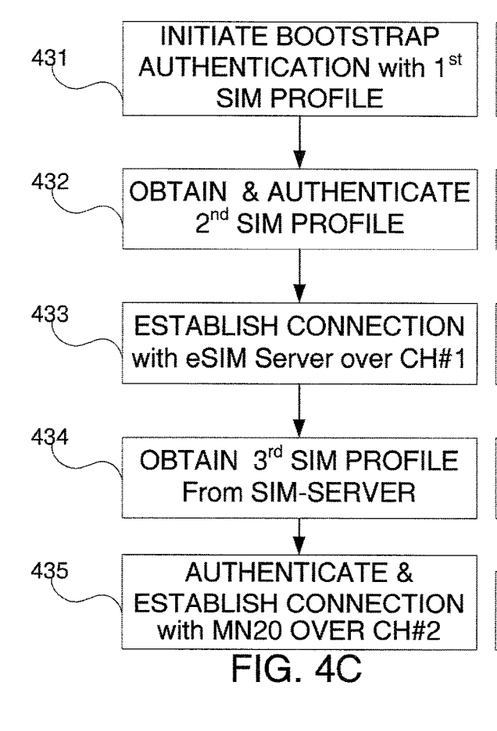

In the eSIM to EzFi sequence, as depicted in FIG. 4C, an appropriate first SIM profile of the eSIM software module may be utilized to gain access to MN 10 over CH-1. Subsequently, enabling SIM virtualization process by means of SIM server 31. It should be noted that modem 140 may utilize concurrent stack capabilities.

In step 431, bootstrap authentication with first SIM profile may be initiated. In some exemplary embodiments, mobile terminal (MT) 100 may obtain an IMSI1, from the first SIM profile of either eSIM software module 331 or 231, and pass it through modem 10 and via CH-1 to an available MSP in MN-1, in order to authenticate MT100 with MN-1. Upon acquiring the IMSI1, the MN-1 challenge the MT100 with an SRES_1. In some exemplary embodiments, either eSIM software module 331 or 231 may run RATs authentication procedures to determine an SRES_2 response to eSIM server 150. Upon responding, with SRES_2 and a proper match between SRES_1 and SRES_2, MT100 is granted access to MN-1 (CH-1 connection established).

In step 432, a second SIM profile from eSIM-server 150 may be obtained and authenticated. In some exemplary embodiments, either eSIM software module 331 or 231 may communicate with eSIM server 150 via CH-1 to request IMSI2 for a second SIM profile. In some embodiments, the SIM virtualization plan may be determined automatically, based on: MT100 hardware capabilities, MT100 configuration, signal strength, MSP network policy (defined in policy module 154 of the eSIM server) a combination thereof, or the like. Upon SIM virtualization plan selection, either eSIM software module 331 or 231 may communicate with subscription manager 153, of eSIM server 150, to obtain and retain IMSI 2 in the second SIM profile.

In step 433, connection with eSIM server may be established over CH #1. In some exemplary embodiments, a proper match between SRES_1 and SRES_2, allows eSIM server 150 to grants MT100 access to MN-2. Subsequently, either eSIM software module 331 or 231 may configure modem 140 to use CH-2 for data traffic. (CH-2 connection established)

In step 434, a third SIM profile may be obtained from SIM-server. In some exemplary embodiments, EzFi software module 332 or 232 of MT100 may communicate with SIM-server 31 via CH-2 and thru WWW30, to request IMSI3 for a third SIM profile. Following the request, the SIM-server 31 may reply to MT100 with an IMSI3 via the same path the request arrived. Upon obtaining the IMSI3, the EzFi software module 332 or 232 retain the IMSI3 in a s SIM profile storage.

In step 435, connection with MN-2 may be authenticated and established over CH-2. In some exemplary embodiments, the EzFi software module 332 or 232 may retrieve the IMSI3 from the SIM profile storage and pass it to modem 140, having a concurrent stack capability, initiating connection with MN-2 via CH-2. Subsequently, MN-2 may reply to the MT100 with an SRES_1 challenge. In some exemplary embodiments, the EzFi software module 332 or 232 fetch the SRES_1 and run RATs authentication procedures to determine an SRES_2 response to NM20. Upon responding, by MT100 via CH-2, with SRES_2 and a proper match between SRES_1 and SRES_2, MN-2 grants MT100 access to MN-2. In some exemplary embodiments, the EzFi software module 332 or 232 may configure modem 140 to use CH-2 as the default connection for data traffic.

It should be noted that, in the case of repeated authentication requests by NM10, steps 431 to 433 may be repeated. Whereas, repeated authentication requests by NM20 only steps 434 to 435 may be repeated.

Figure 4D:
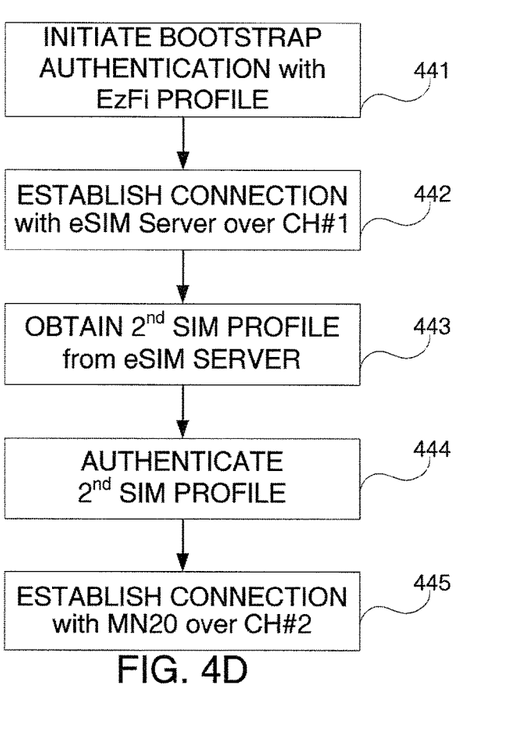

In the EzFi to eSIM sequence, as depicted in FIG. 4D, a bootstrap roaming profile of the EzFi software module may be utilized to gain access to MN 10 over CH-1. Subsequently, enabling SIM virtualization process by means of eSIM server 150.

In step 441, bootstrap authentication with EzFi profile may be initiated. In some exemplary embodiments, mobile terminal (MT) 100 may obtain an IMSI1, an appropriate the first SIM profile of either EzFi software module 332 or 232, and pass it through modem 10 and via CH-1 to an available MSP in MN-1, in order to authenticate MT100 with MN-1. Upon acquiring the IMSI1, the MN-1 challenge the MT100 with an SRES_1.

In step 442, connection with eSIM server 150 may be established over CH #1. In some exemplary embodiments, either eSIM software module 331 or 231 (depend on the configuration) may run RATs authentication procedures to determine an SRES_2 response to MN-1. Upon responding, with SRES_2 and a proper match between SRES_1 and SRES_2, MT100 is granted access to MN-1 (CH-1 connection established).

In step 443, a second SIM profile may be obtained from eSIM server 150. In some exemplary embodiments, either eSIM software module 331 or 231 may communicate with eSIM server 150 via CH-1 to request IMSI2 for a second SIM profile. Following the request, the eSIM server 150 may submit to MT100 a menu, from virtual subscription store 151, with options for cellular subscriptions plans to choose from. In some exemplary embodiments, the menu may be presented on a display (not shown) of the MT100, so a user may select an appropriate SIM virtualization plan. In other exemplary embodiments, the SIM virtualization plan may be determined automatically, based on: MT100 hardware capabilities, MT100 configuration, MSP network policy (defined in policy module 154 of the eSIM server) a combination thereof, or the like. Upon SIM virtualization plan selection, either eSIM software module 331 or 231 may communicate with subscription manager 153, of eSIM server 150, to obtain and retain IMSI 2 in the second SIM profile.

In step 444, the second SIM profile may be authenticated. In some exemplary embodiments, either eSIM software module 331 or 231 may retrieve the IMSI2 from the second SIM profile storage and initiate connection with MN-2 via CH-2. Subsequently, MN-2 may reply to the MT100 with an SRES_1 challenge, which will run a control application, of the eSIM software module 331 or 231, to determine an SRES_2 response to MN-2.

In step 445, connection with MN-2 may be established over CH-2. In some exemplary embodiments, a proper match between SRES_1 and SRES_2, MT100 is granted access to MN-2. Subsequently, either eSIM software module 331 or 231 may configure modem 140 to use CH-2 as the default connection for data traffic. (CH-2 connection established)

It should be noted that, in the case of repeated authentication requests by NM10, steps 441 to 443 may be repeated. Whereas, repeated authentication requests by NM20 only steps 444 to 445 may be repeated.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A SIM virtualization system, having servers selected from a group comprising of: eSIM server; SIM server; SIMs bank; and any combination thereof, the system comprising:
   a SIM-Less mobile terminal having hardware configuration selected from the group comprising of: first configuration; second configuration; and a combination thereof, the SIM-Less mobile terminal comprising:
      a processor configured to execute SIM virtualization functionalities;
      a single cellular modem communicating over CH-1 and CH-2 with at least one cellular network; and
      a non-transitory memory capable of retaining:
         at least one native SIM profile used by a mobile terminal for emulating a SIM selected from the group comprising of: a universal integrated circuit card (UICC); embedded UICC (eUICC); software-implemented eUICC; and any combination thereof;
         at least one virtual SIM profile; and
         software stack operative to cause the mobile terminal to obtain and authenticate the at least one virtual SIM profile; and wherein the at least one virtual SIM profile is obtained from the servers selected from the group comprising of the SIM server coupled with a SIM bank, the eSIM server and a combination thereof.

2. The system of claim 1, wherein the SIM-server is configured to allocate virtual SIM for the mobile terminal; and wherein the SIM Bank comprising a plurality of SIMs selected from a group comprising of physical SIM cards; SIMs profiles; and a combination thereof.

3. The system of claim 1, wherein the software stack further comprises EzFi and eSIM software modules.

4. The system of claim 1, wherein, at the first configuration of the mobile terminal,
   the processor is an independent application processor;
   the non-transitory memory is an independent memory;
   the single cellular modem is selected from the group comprising of: a concurrent stack modem; a nonconcurrent stack modem, and a combination thereof, wherein the concurrent stack modem is capable of simultaneously communicating over CH-1 and CH-2; and
   wherein the first configuration of the mobile terminal further comprises an AT commands bus and an application protocol data unit (APDU) bus used for communication between the application processor and the single cellular modem.

5. The system of claim 4, wherein the first configuration of the mobile terminal further comprises a hardware SIM used for initial authentication and a selector, wherein the selector is configured to route the APDU bus between the single cellular modem and either the application processor or the hardware SIM.

6. The system of claim 1, wherein, at the second configuration of the mobile terminal, the processor is a CPU coupled with the non-transitory memory, wherein the CPU and the memory are integral part of the single cellular modem.

7. The system of claim 6, wherein the CPU and the memory and the single cellular modem are parts of a system on a chip (SoC).

8. A SIM-Less mobile terminal providing SIM virtualization in systems having servers selected from a group comprising of: eSIM server; SIM server; SIMs bank; and any combination thereof, the SIM-Less mobile terminal comprising:
   a first configuration;
   a second configuration, wherein both configurations are comprising:
      a processor configured to execute SIM virtualization functionalities;
      a single cellular modem capable of communicating over CH-1 and CH-2 with at least one cellular network; and
      a non-transitory memory capable of retaining:
         at least one native SIM profile used by a mobile terminal for emulating a SIM selected from the group comprising of: a universal integrated circuit card (UICC); embedded UICC; software-implemented eUICC; and any combination thereof;
         at least one virtual SIM profile; and
         software stack operative to cause the mobile terminal to obtain and authenticate the at least one virtual SIM profile; and wherein the at least one virtual SIM profile is obtained from the servers selected from the group comprising of the SIM server coupled with a SIM bank, the eSIM server and a combination thereof.

9. The SIM-Less mobile terminal of claim 8, wherein the SIM-server is configured to allocate virtual SIM for the mobile terminal; and wherein the SIM Bank comprising a plurality of SIMs selected from a group comprising of physical SIM cards; SIMs profiles; and a combination thereof.

10. The SIM-Less mobile terminal of claim 8, wherein the software stack further comprises EzFi and eSIM software modules.

11. The SIM-Less mobile terminal of claim 8, wherein, at the first configuration of the mobile terminal,
   the processor is an independent application processor;
   the non-transitory memory is an independent memory;
   the single cellular modem is selected from the group comprising of: a concurrent stack modem; a nonconcurrent stack modem, and a combination thereof, wherein the concurrent stack modem is simultaneously communicating over CH-1 and CH-2; and
   wherein the first configuration of the mobile terminal further comprises an AT commands bus and an application protocol data unit (APDU) bus used for communication between the application processor and the single cellular modem.

12. The SIM-Less mobile terminal of claim 11, wherein the first configuration of the mobile terminal further comprises a hardware SIM used for initial authentication and a selector, wherein the selector is configured to route the APDU bus between the single cellular modem and either the application processor or the hardware SIM.

13. The SIM-Less mobile terminal of claim 8, wherein, at the second configuration of the mobile terminal, the processor is a CPU coupled with the non-transitory memory, wherein the CPU and the memory are integral part of the single cellular modem.

14. The SIM-Less mobile terminal of claim 13, wherein the CPU and the memory and the single cellular modem are parts of a system on a chip (SoC).

15. A SIM virtualization method for SIM-Less mobile terminal, having a modem with concurrent stack capabilities, the method comprising:
   activating an EzFi software module;
   initiating bootstrap authentication of the SIM-Less mobile terminal using an IMSI1 of a first SIM profile with a first mobile network, wherein the first SIM profile is obtained from the EzFi software module;
   establishing connection with the first mobile network over channel one upon verifying that an SRES_2 response calculated by the EzFi software module matches an SRES_1 challenge sent by the first mobile network;
   obtaining a second SIM profile from a SIM-server coupled with a SIM bank via the channel one and the first mobile network, and retain the second SIM profile in the EzFi software module;
   authenticating the SIM-Less mobile terminal with a second mobile network, by simultaneously passing an IMSI2, via channel two to the second mobile network, wherein the IMSI2 is retrieved from the second SIM profile;
   establishing connection with the second mobile network over the channel two upon verifying that the SRES_2 response calculated by the EzFi software module the SRES_1 challenge sent by the second mobile network.

16. The method of claim 15, wherein said obtain a second SIM profile from a SIM-server coupled with a SIM bank further comprising:
   establishing connection with an eSIM server over first mobile network and channel one and obtaining a second SIM profile from the eSIM-server and retaining the second SIM profile in the EzFi software module;
   obtaining a third SIM profile from a SIM-server coupled with a SIM bank via channel one and the first mobile network, and retain the third SIM profile in the EzFi software module;
   authenticating the mobile terminal with a second mobile network, by simultaneously passing an IMSI3, via channel two to the second mobile network, wherein the IMSI3 is retrieved from the third SIM profile;
   establishing connection with the second mobile network over channel two upon verifying that an SRES_2 response calculated by the EzFi software module an SRES_1 challenge sent by the second mobile network.

17. The method of claim 15, wherein the EzFi software module launches a user's interface application for selecting the second SIM profile of a mobile service provider out of a menu comprising a plurality of mobile service providers.

18. A SIM virtualization method for SIM-Less mobile terminal having a touchscreen display, the method comprising:
   activating an eSIM software module;
   initiating bootstrap authentication of the SIM-Less mobile terminal using an IMSI1 of a first SIM profile with a first mobile network, wherein the first SIM profile is obtained from the eSIM software module;
   establishing connection with the first mobile network over channel one upon verifying that an SRES_2 response calculated by the eSIM software module matches an SRES_1 challenge sent by the first mobile network;
   obtaining a second SIM profile from an eSIM-server via the channel one and the first mobile network, and retain the second SIM profile in the eSIM software module;
   authenticate the SIM-Less mobile terminal with a second mobile network, by passing an IMSI2, via channel two to the second mobile network, wherein the IMSI2 is retrieved from the second SIM profile;
   establishing connection with the second mobile network over the channel two upon verifying that the SRES_2 response calculated by the eSIM software module the SRES_1 challenge sent by the second mobile network.

19. The method of claim 18, wherein the eSIM software module launches a user's interface application for selecting the second SIM profile of a mobile service provider out of a menu comprising a plurality of mobile service providers.

20. The method of claim 18, wherein the first SIM profile is obtained from the EzFi software module.

* * * * *